(12) United States Patent
Gul

(10) Patent No.: US 7,465,087 B2
(45) Date of Patent: Dec. 16, 2008

(54) ARMOURED FLEXIBLE AVERAGING TEMPERATURE SENSOR

(75) Inventor: S. Asim Gul, Orono, MN (US)

(73) Assignee: Mamac Systems, Inc., Chanhassen, MN (US)

( * ) Notice: Subject to any disclaimer, the term of this patent is extended or adjusted under 35 U.S.C. 154(b) by 136 days.

(21) Appl. No.: 11/293,630

(22) Filed: Dec. 2, 2005

(65) Prior Publication Data

US 2007/0127546 A1    Jun. 7, 2007

(51) Int. Cl.
*G01K 1/16* (2006.01)
*G01K 7/14* (2006.01)
*G01K 7/16* (2006.01)

(52) U.S. Cl. .................. 374/147; 374/185; 374/163; 374/208; 374/44; 374/137; 374/29

(58) Field of Classification Search ............... 374/147, 374/183, 185, 163, 208, 187, 112, 115, 137, 374/148, 43, 44, 29, 141; 338/22 R, 25, 338/28; 174/68.1, 84 R, 104
See application file for complete search history.

(56) References Cited

U.S. PATENT DOCUMENTS

| | | | | |
|---|---|---|---|---|
| 1,692,301 | A | * | 11/1928 | Heslewood .................. 374/200 |
| 1,724,520 | A | * | 8/1929 | Schlaich ..................... 374/202 |
| 2,147,021 | A | * | 2/1939 | Ford ............................ 285/115 |
| 2,410,218 | A | * | 10/1946 | Kelly .......................... 136/224 |
| 2,415,187 | A | * | 2/1947 | Moore ......................... 338/28 |
| 2,465,685 | A | | 3/1949 | Henderson |
| 2,792,481 | A | | 5/1957 | Wood |
| 2,826,625 | A | * | 3/1958 | MacDonald ................ 136/235 |
| 2,886,683 | A | * | 5/1959 | Klavitter ..................... 338/30 |
| 2,946,974 | A | * | 7/1960 | Sias ............................ 338/28 |
| 3,088,319 | A | * | 5/1963 | Neumayer .................. 374/183 |

(Continued)

FOREIGN PATENT DOCUMENTS

JP          63047644 A   *  2/1988

(Continued)

OTHER PUBLICATIONS

Mamac Systems, Duct Averaging Temp Sensors, Model TE-705, 2003, Minneapolis, Minnesota.

(Continued)

*Primary Examiner*—Gail Verbitsky
(74) *Attorney, Agent, or Firm*—Shewchuk IP Services; Jeffrey D. Shewchuk

(57) ABSTRACT

A temperature sensor approximates fluid temperature averaged across a location range by including an outer armour layer. Several resistance temperature detectors are spaced in an electrical circuit which is then protected in the outer armour layer. The outer armour layer is woven without any seam to enhance its longitudinal thermal conductivity. In the preferred weave, twenty-four stands of sixteen metal threads each are helically woven. The electrical circuit is sealed interior to the armour layer so any condensation or moisture within the armour layer does not affect the circuit. The armour layer is sealed on its ends to the sheathing of the underlying circuit, so the armour layer provides stress relief across the connections of the resistance temperature detectors to the circuit. The resulting sensor is robust and durable, as well as very flexible.

17 Claims, 3 Drawing Sheets

U.S. PATENT DOCUMENTS

| | | | |
|---|---|---|---|
| 3,319,215 A | 5/1967 | Moore | |
| 3,380,304 A | 4/1968 | Zysk | |
| 3,396,357 A | 8/1968 | Borg et al. | |
| 3,445,799 A * | 5/1969 | Slonneger | 337/380 |
| 3,653,262 A | 4/1972 | Ehrenfried et al. | |
| 3,751,305 A * | 8/1973 | Huebscher | 136/221 |
| 3,955,419 A | 5/1976 | Barton et al. | 374/166 |
| 4,041,771 A * | 8/1977 | Allan et al. | 73/40.5 R |
| 4,147,061 A | 4/1979 | West et al. | |
| 4,251,794 A | 2/1981 | Swenson | |
| 4,307,606 A | 12/1981 | Johnson | |
| 4,386,525 A | 6/1983 | Mooney | |
| 4,435,639 A * | 3/1984 | Gurevich | 219/544 |
| 4,467,163 A * | 8/1984 | Pauly et al. | 219/754 |
| 4,553,432 A * | 11/1985 | Barlian et al. | 374/142 |
| 4,580,910 A | 4/1986 | Corwin | |
| 4,861,169 A | 8/1989 | Yoshimura | |
| 4,922,083 A * | 5/1990 | Springs et al. | 219/549 |
| 4,929,092 A * | 5/1990 | Taguchi et al. | 374/183 |
| 4,934,831 A * | 6/1990 | Volbrecht | 374/183 |
| 4,969,749 A | 11/1990 | Hasselmann | |
| 4,994,780 A * | 2/1991 | McQueen | 338/24 |
| 5,047,594 A | 9/1991 | Powell | 174/88 R |
| 5,221,916 A * | 6/1993 | McQueen | 338/24 |
| 5,268,558 A | 12/1993 | Youssef et al. | |
| 5,286,921 A * | 2/1994 | Fontaine et al. | 174/84 R |
| 5,454,641 A | 10/1995 | Parker et al. | |
| 5,520,461 A * | 5/1996 | Curry et al. | 374/179 |
| 5,864,282 A * | 1/1999 | Hannigan et al. | 338/30 |
| 6,246,002 B1 * | 6/2001 | Rumsey | 174/84 R |
| 6,341,892 B1 * | 1/2002 | Schmermund | 374/185 |
| 6,588,931 B2 * | 7/2003 | Betzner et al. | 374/185 |
| 6,592,254 B2 | 7/2003 | Gul | |
| 6,666,578 B2 * | 12/2003 | Gibbs et al. | 374/142 |
| 6,814,486 B2 | 11/2004 | Sidoni | |
| 6,890,095 B2 | 5/2005 | Gul | |
| 7,060,949 B1 * | 6/2006 | Davis et al. | 219/536 |
| 7,290,601 B2 * | 11/2007 | Chalifoux et al. | 166/66 |
| 7,360,947 B2 * | 4/2008 | Krishnamurthy et al. | 374/208 |
| 7,391,220 B2 * | 6/2008 | Vallet et al. | 324/539 |
| 2006/0115221 A1 * | 6/2006 | Chalifoux et al. | 385/101 |
| 2007/0102412 A1 * | 5/2007 | Lhuillier | 219/202 |
| 2007/0171959 A1 * | 7/2007 | Irrgang et al. | 374/185 |

FOREIGN PATENT DOCUMENTS

JP      2003077622 A *    3/2003

OTHER PUBLICATIONS

Mamac Systems, Duct Temperature Sensors, Model TE-701/702, 2003, Minneapolis, Minnesota.

Mamac Systems, Pipe Temperature Sensors, Model TE-703/704, 2003, Minneapolis, Minnesota.

\* cited by examiner

ARMOURED FLEXIBLE AVERAGING TEMPERATURE SENSOR

CROSS-REFERENCE TO RELATED APPLICATION(S)

None.

BACKGROUND OF THE INVENTION

The present invention generally relates to an apparatus for electronically sensing an averaged temperature. More specifically, the present invention relates to a temperature sensor which uses multiple, spaced sensing elements such as thermistors in a circuit, such as for use in monitoring an average air temperature across an area within a large ventilation (HVAC) system.

Controlled, forced-air ventilation systems are known which move air within buildings. In many ventilation systems, fans draw fresh outside air into a building, and exhaust stale interior air to the outside. The ventilation systems are used with venting or ducts to provide an air flow path throughout the building, including to and from heaters and/or air conditioners. Often the ventilations systems perform heat transfer (recovery) between the interior air to be exhausted and the outside air being introduced. For proper control of these ventilation systems, parameters such as fan speeds or damper positions are set and changed based upon sensed air temperatures within the building or within the system. Particularly in systems where air of different temperatures mixes, it is important to be able to accurately determine average air temperature, such as the average air temperature across a vertical cross-section at a location within a duct.

As explained in U.S. Pat. Nos. 6,592,254 and 6,890,095, incorporated by reference herein, early structures for sensing average temperatures included capillary tubes and resistance temperature detectors ("RTDs") such as platinum strand sensors, and metallic tube-enclosed thermistor-based sensors. None of these sensors were adequately easy to install and robust for use as desired in many HVAC duct sensing environments.

The metallic tube-enclosed thermistor-based sensors in particular had problems. Ascertaining the location of the thermistors within the tube was difficult. Particularly for long runs of measurement (typically from six to twenty four feet or more), the tube was bulky and difficult to ship. Bending the tube improperly can cause inadvertent crimping and/or kinking of the metal, which could effectively sever the electrical connections or which could lead to small holes forming in the tube. Where small holes in a metal tube are created, cycled temperature differences can result in condensation on the inside of the tube which sometimes can affect the accuracy of the temperature sensor. Condensation at the location of a thermistor could short-circuit the thermistor and lead to anomalous temperature readings. The solder connections are exposed to tension and stresses associated with adjusting and bending the wires. Over time, the solder points weaken and electrical connections break. The resulting open circuit may be difficult to locate if the wire is placed inside a tube, and may be costly to repair no matter how the sensor is situated. The metallic nature of the tube requires dielectric insulation to prevent electrical shorting between the thermistors and the wall of the tubing. The insulation/metal tube support and protection configuration thermally insulates the thermistor or platinum strand from the air, slowing the response time of the averaging temperature sensor.

Whether each thermistor or its overlying insulation contacted the metal tube was inconsistent and depended upon installation. If the metal tube was bent in a particular fashion during installation, a thermistor might make solid contact with the metal tube for good thermal conductivity. If the metal tube was bent in a different fashion during installation, an air gap might exist between the thermistor and the metal tube retarding heat transfer therebetween. Thus, the amount of thermal conduction from the metal tube to each thermistor varied in inconsistent and unknown ways.

Assembly of the electrical circuit of thermistor arrays has been problematic. An insulative card has been used, allowing solder points between the leads for the thermistor to the wires extending between thermistor locations. The soldering card further adds thermal ballast to slow response time. Response time in the control systems is fairly significant, because delays in control can lead to damage to system elements, particularly if the system manipulates outside air at a drastically different temperature than the inside air.

Despite the plethora of problems noted here, the metallic tube-enclosed thermistor-based sensors became a market leading standard in the HVAC industry. In contrast to the metallic tube-enclosed thermistor-based sensors, the sensor described and claimed in U.S. Pat. Nos. 6,592,254 and 6,890,095 has begun to revolutionize averaging duct temperature sensors in the HVAC industry. Still, improvements can be made to averaging duct temperature sensors, particularly for certain environments of use.

BRIEF SUMMARY OF THE INVENTION

The present invention is a temperature sensor for approximating fluid temperature averaged across a location range. The sensor includes several RTDs spaced in an electrical circuit which is then protected in an outer armour layer. The electrical circuit is sealed so any condensation or moisture within the armour layer does not affect the circuit. The resulting sensor is robust and durable, as well as very flexible. The outer armour layer includes longitudinally extending metal strands or filaments which conduct heat longitudinally toward and away from the RTD. In one aspect, the armour layer is woven without any seam, and is sealed on its ends to the sheathing of the underlying circuit.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
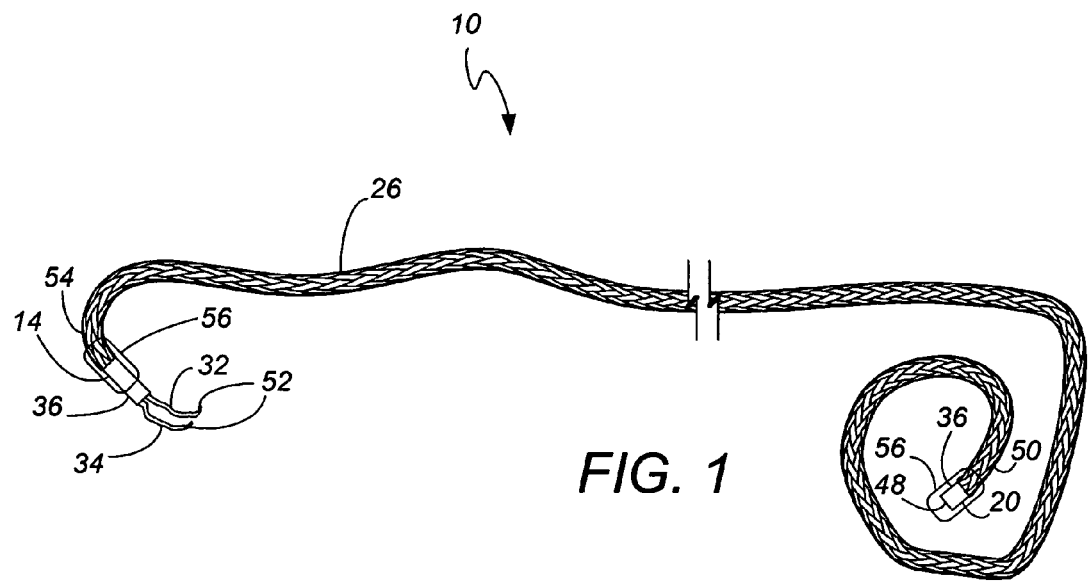
FIG. 1 is a plan view of a temperature sensor in accordance with the present invention.
Figure 3:
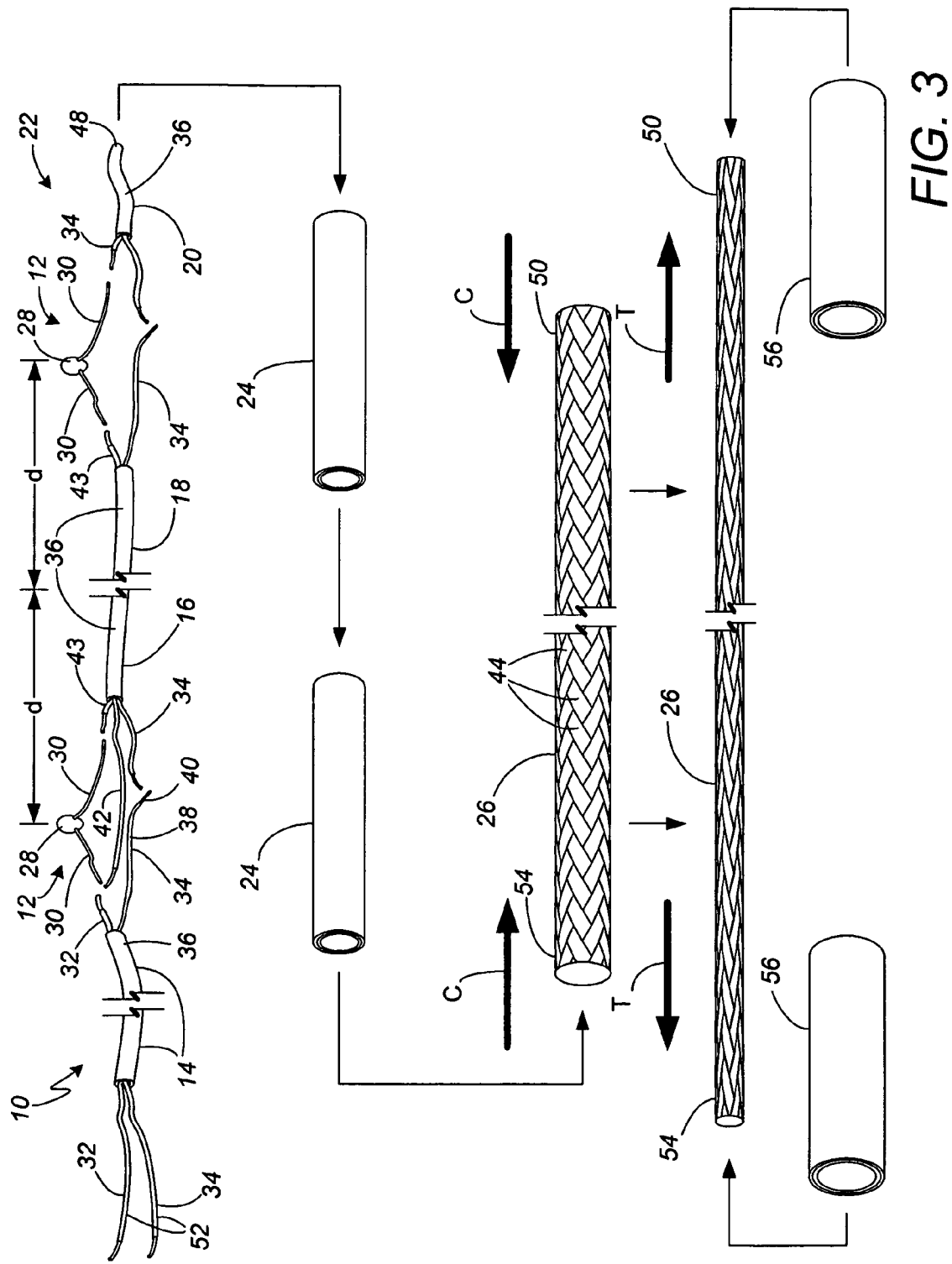
FIG. 3 is an exploded assembly view of the temperature sensor of FIG. 1.

As depicted assembled in FIG. 1 and unassembled in FIG. 3, an averaging temperature sensor 10 includes number of sensing elements 12 connected by cables 14, 16, 18, 20 in an electrical circuit 22 as generally disclosed in U.S. Pat. Nos. 6,592,254 and 6,890,095, assigned to the assignee of the present invention and incorporated herein by reference. As shown in FIG. 3, the electrical circuit 22 is sealed by dielectric insulators 24. The sealed electrical circuit 22 is then disposed within an armour layer 26. In use, the armour layer 26 is exposed for thermal transfer with the surrounding fluid (typically an air stream), and the armour layer 26 transmits heat longitudinally along the sensor 10 to or from the sensing elements 12. As best shown in FIG. 1, the armour layer 26 is protective and flexible around the electrical circuit 22, so the entire sensor 10 is very rugged and robust.

The electrical circuit 22 is arranged with the sensing elements 12 spaced along the length of the cables 14, 16, 18, 20 to form a string of sensing elements 12 each separated by a predetermined distance d. Each sensing element 12 includes a component 28 which changes electrical response between the first and second leads 30 as a function of temperature.

The preferred sensing elements 12 are resistance temperature detectors ("RTDs"), which change electrical resistance in a known manner responsive to changes in temperature, with the preferred RTDs being thermistors. Such thermistors 12 are commonly commercially available in various ohmic ratings, such as from BetaTHERM Corporation of Shrewsbury, Mass. For example, thermistors which have a nominal resistance at 25° C. of 0.1kΩ, 0.3kΩ, 1kΩ, 2kΩ, 2.2kΩ, 3kΩ, 5kΩ, 10kΩ, 30kΩ, 50kΩ, 100kΩ, and 1MΩ are commonly used in the heating, ventilation and air conditioning ("HVAC") industry. Such thermistors may be formed by intimately blending high purity inorganic powders (typically transition metal oxides), which are then formed into large wafers, sintered and prepared for chip themistor production. Alternatively, the sensing element may be a platinum, nickel or balco RTD, such as rate at 0.1kΩ or 1kΩ. Each sensing element 12 has two electrical leads 30 for connection into the electrical circuit 22.

Figure 4:
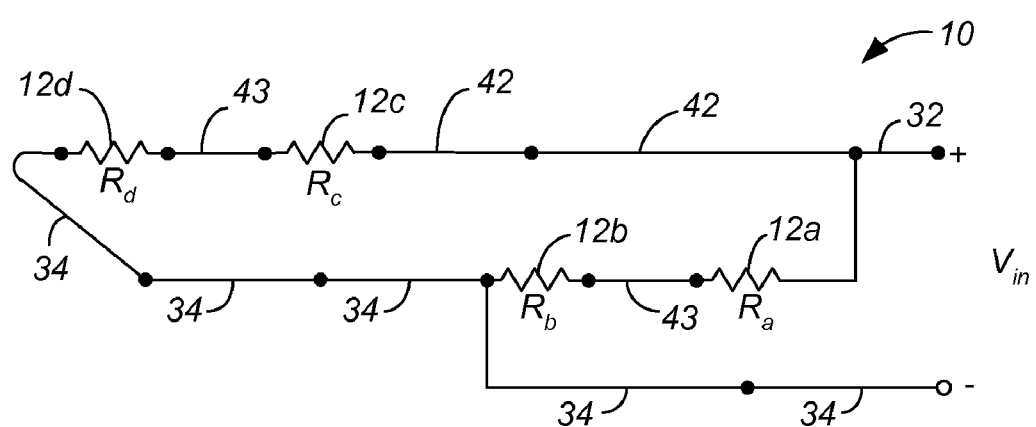
FIG. 4 is a circuit diagram showing a square parallel/series array for a temperature sensor of the present invention.

The first length of cable 14 includes a positive voltage wire 32 and a ground wire 34 within sheathing 36. The sheathing 36 terminates to provide assembly access to the positive voltage wire 32 and the ground wire 34. The insulators 38 for positive voltage wire 32 and ground wire 34 are stripped to provide ends 40 for electrical connection. The positive voltage wire 32 is electrically connected to one of leads 30 of the thermistor 12. In the preferred series/parallel circuit 22, a parallel positive voltage wire 42 is also connected to the positive voltage wire 32, and an intermediate connection wire 43 runs between RTDs 12. The RTDs 12 are preferably arranged in a parallel/series square array (additional thermistors shown in FIG. 4). All the wires 32, 34, 42, 43 are common electrical wires for carrying the specified current and voltage within a dielectric insulator 38. For instance, RTDs commonly use relatively low current, typically less that 100 μA, so the wires 32, 34, 42, 43 can be about 30 A.W.G. or thicker, of a common conductor such as tin or copper, within a common insulator such as polyimide.

The sheathing 36 is electrically insulative and flexible. Each single piece of sheathing 36 defines a sheathing lumen which preferably contains all circuit wires 32, 34, 42, 43 running between adjacent, electrically connected RTDs 12. The sheathing 36 may provide low flammability. For example, the sheathing 36 may be plenum-rated cable sheathing (such as UL - 94 VO). Many other types of materials for the sheathing 36 could be used. If desired, the circuit wires 32, 34, 42, 43 may alternatively be used within the armour layer 26 without an outer sheathing.

As shown in FIG. 3, once the electrical connections are made, an insulator 24 is positioned over each thermistor 12. Insulators 24 are electrically insulative or dielectric, preventing electrical conduction between the armour layer 26 and the thermistors 12. The preferred insulator 24 is formed of a flexible, elastomeric material, and may be plenum-rated like the sheathing 36. For example, the insulator 24 may be formed of a cross-linked modified polyolefin tubing having an adhesive coated interior as disclosed in application Ser. No. 10/436,451, assigned to the assignee of the present invention and incorporated by reference. The insulator material should be as thin as possible without being so thin as to allow holes or to rupture during assembly or use. The thinner the insulator material, the less it thermally insulates its underlying thermistor 12, and the faster the thermal response of the sensor 10. Other types of RTDs may not require the insulator 24 to be distinct from the thermistor 12.

In the preferred embodiment, the insulator 24 extends from the sheathing 36 on one side of the thermistor connection, over the thermistor 12, to the sheathing 36 on the other side of the thermistor connection. The length of the insulator 24 thus covers the exposed wires 30, 40, the thermistor 12, the various connections, and the ends of the wire insulation 38 up to the sheaths 36 on both sides, so that the entire connection area is covered. By positioning the insulator 24 so that it overlaps the sheathing 36 on both sides of the thermistor connection, the connections are protected against tension placed on the cables 14, 16, 18, 20. The insulator 24 helps transfer both the tensile stress and the bending stress away from the electrical connections and instead to the sheathing 36, thereby reducing wear and stress on the electrical connections and improving the durability of the sensor 10.

The preferred conductor connections are made by splicing. Spliced connections can be more quickly made during manufacturing than soldering or other types of connections. Because the present invention provides ample stress relief for the electrical connections, pulling out of the spliced connections is not a problem. Alternatively, the electrical connections may be made using a solder bead, adhesive, taping or through other means.

The insulator 24 helps to maintain the electrical connections by tightening around the existing connections. Whether the connections are made by splicing, using a solder bead, adhesive, taping or through other means, the insulator 24 helps secure the connections. The insulator 24 also effectively seals the electrical connections and leads 30 of the thermistor 12 from airflow, and avoids the condensation problems associated with prior art tubing.

The insulator 24 also tightens around its RTD 12 for intimate contact and good thermal conductivity between the insulator 24 and its RTD 12. If desired, the material of the insulator 24 may be specially fabricated to increase its thermal conductivity. Minimizing or eliminating any airgap between the insulator 24 and its RTD 12 helps make the temperature sensor 12 more consistent and accurate in sensing temperature of the flow.

Figure 2:
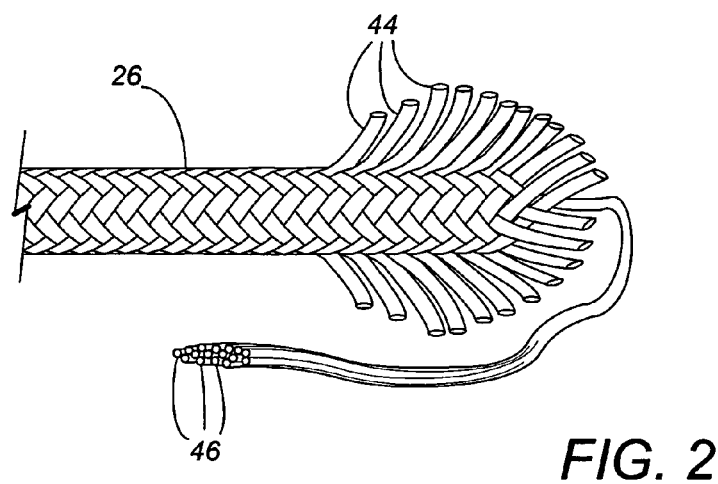
FIG. 2 is an enlarged view depicting the preferred woven armour layer, showing the strands of the weave and further enlarging and showing the threads or filaments of a strand.

Once the connections of the electrical circuit 22 are sealed and insulated, the electrical circuit 22 is positioned within the armour layer 26. As best shown in FIG. 2, the armour layer 26 is formed of at least four strands 44 extending longitudinally. The armour layer 26 protects the electrical circuit 22 and conducts heat along the strands 44 in the longitudinal direction. By conducting heat longitudinally, the armour layer 26 allows the RTDs 12 to acquire a reading which is more representative of an average temperature of the sensor 10 rather than merely at point locations. The longitudinal strands 44 provide a metal conduction path which continuously extends at least half of the distance d between neighboring RTDs 12, so the multiple point RTDs 12 measure a temperature which is truly an average of the local temperatures witnessed all along the length of the sensor 10.

The preferred armour layer 26 is braided or woven without a seam. The preferred weaving pattern is provided by twelve strands 44 each helically oriented in a parallel orientation (e.g., clockwise when viewed axially from the distal end) interwoven with twelve strands 44 each helically oriented in an opposite parallel orientation (e.g., counterclockwise when viewed axially from the distal end). The preferred weave is an over-two, under-two pattern relative to the opposite helix arrangement. Strands 44 in both directions (clockwise and counterclockwise) are tightly placed next to neighboring strands 44 so the weave provides minimal gaps in its armouring protection.

To further increase the flexibility of the armour layer 26, each strand 44 is made up of a plurality of longitudinally extending threads or filaments 46. Each metal filament 46 is significantly thinner than the temperature sensor 10 as a whole, and the large number of thin metal filaments 46 results in an armour layer 26 which is strong but still very flexible. For instance, each filament 46 member should have a thickness which is less than 10% of the overall thickness of the temperature sensor 10.

In the preferred embodiment, sixteen metal filaments 46 are used in each strand 44 of the weave. If a four strand weave were used, this would result in sixty-four different continuous metal filament members 46. The preferred armour layer 26 contains 16 filaments/strand×24 strands=384 continuous filaments 46 extending longitudinally and helically about the electrical circuit 22. Each filament 46 is preferably provided by a tin plated copper thread having a diameter of about 0.003 inches. The sensor 10 has a diameter or thickness of about $1/10^{th}$ of an inch, so each filament 46 has a diameter which is about 3% or less than the overall thickness of the sensor 10.

The preferred weave provides several distinct advantages over the metal tubing of the prior art. With a woven configuration, the armour layer 26 is much more flexible than prior art metal tubing. The sensor 10 can be wrapped, bent, flexed, even tied into a knot much like cord or rope. No tubing bender is needed either for wrapping the sensor 10 or straightening the sensor 10. The sensor 10 can be easily shipped in a small box (not shown).

The helical wrapping permits the armour layer 26 to change diameter, particularly during assembly of the sensor 10 as shown in FIG. 3. To place the electrical circuit 22 into the armour layer 26, a compressive force C is placed on the armour layer 26 to increase its helix angle and increase the inside diameter of the armour layer 26. Once the electrical circuit 22 is positioned as desired within the armour layer 26, a tensile force T is placed on the armour layer 26 to decrease its helix angle and decrease the inside diameter of the armour layer 26. The armour layer 26 is pulled until it snugly fits around both the sheathing 36 and the insulator protected thermistors 12. With this snug fit, the armour layer 26 makes intimate and consistent contact around each RTD 12 for consistent thermal conductivity from the armour layer 26 through the insulator 24 to each RTD 12. Minimizing or eliminating any airgap between the armour layer 26 and each RTD 12 helps make the temperature sensor 12 more consistent and accurate in sensing temperature of the flow.

Preferably the distal end 48 of the electrical circuit 22 extends slightly, such as about ¼-½ inch, beyond the distal end 50 of the armour layer 26. Proximal leads 52 for the electrical circuit 22 extend out of the proximal end 54 of the armour layer 26 a sufficient distance for attachment into an HVAC controller (not shown). As an alternative to inserting the electrical circuit 22 into an already formed armour layer 26, the armour layer can be woven around the electrical circuit 22.

After the armour layer 26 has been pulled about the electrical circuit 22, both the proximal and distal ends 50, 54 of the armour layer 26 are attached to the sheathing 36 of the electrical circuit 22. By securing the armour layer 26 to the sheathing 36 both proximally and distally of the RTDs 12, the armour layer 26 provides the stress relief bridging clips of U.S. Pat. Nos. 6,592,254 and 6,890,095. The preferred method of attachment involves end cap attachments 56 to secure the armour layer 26 to the sheathing 36. The preferred end cap attachments 56 are provided by a cross-linked modified polyolefin tubing having an adhesive coated interior as disclosed in application Ser. No. 10/436,451. If desired and as depicted in FIG. 1, the end caps 56 may be transparent or translucent. A proximal end cap tube 56 is placed around an external surface of the proximal end 54 of the armour layer 26 so it also extends over a proximal section of the sheathing 36. A distal end cap tube 56 is placed around an external surface of the distal end 50 of the armour layer 26 so it extends further around the distal end 48 of the electrical circuit 22 and even further to completely seal the distal end of the sensor device 10. The proximal and distal end caps 56 also prevent any fraying of the armour layer 26.

The woven armour layer 26 forms a seamless or circumferentially continuous lumen about the electrical circuit 22. With no seam, there is no position of weakness or likely fraying of the armour layer 26, and the sensor 10 retains an attractive, "looks-like-new" appearance over an extended period of time.

The temperature sensor 10 of the present invention is particularly contemplated for use in an HVAC system within a ventilation duct (not shown), to be read by an HVAC control unit (not shown). The air flow may have different temperatures at different locations in the duct, and the different temperatures may change differently as a function of time. The sensor 12, when placed in the duct, will provide a single equivalent or average temperature reading. The armour layer 26 conducts heat along the length of the sensor 12, so each RTD 12 will be heated or cooled via the armour layer 26 in accordance with the distance that heat needs to travel through the armour layer 26 (i.e., how far away a local hot or cool spot in the flow is). The sensor 10 thus provides two separate, complementary forms of temperature averaging; one due to having multiple RTDs 12 in a single circuit, a second because the temperature at each RTD 12 is affected by heat conduction along the armour layer 26. The RTDs 12 are spaced along the length of the temperature sensor 10 as desired for positioning and support of the RTDs 12. In a preferred embodiment, the spacing d between RTDs 12 is selected to be equal, such as about three feet.

With the armour layer 26, the RTDs 12 and insulators 24 are no longer visible on the outside of the sensor 10. The insulators 24 are preferably slightly thicker and/or slightly less flexible than the sheathing 36, so an installer can still readily determine the locations of the RTDs 12 by the slight increase in thickness of the sensor 10 or slight decrease in flexibility at the RTD locations.

The armour layer 26 is very durable and protects the electrical circuit 22 from damage. In contrast to the point averaging provided by the primary embodiment of U.S. Pat. Nos. 6,592,254 and 6,890,095, the temperature sensing of the armour sensor 10 is more representative of the entire length of the sensor 10 rather than just the locations of the RTDs 12. Openings in the armour layer 26 permit a limited amount of air flow therethrough, beneficial both for a quicker response time and so any condensation within the armour layer 26 can be dissipated via evaporation. The electrical circuit 22 is sealed separately from the armour layer 26, so any condensation within the armour layer 26 does not short out the circuit 22.

Although the present invention has been described with reference to preferred embodiments, workers skilled in the art will recognize that changes may be made in form and detail without departing from the spirit and scope of the invention.

The invention claimed is:

1. A temperature sensor for approximating fluid temperature averaged across a location range in a duct, the sensor comprising:
    an insulated sensing circuit which is flexible and extends longitudinally, the insulated sensing circuit comprising:
        at least one resistance temperature detector (RTD) having a first lead, a second lead, and a sensing element which changes electrical resistance between the first and second leads as a function of temperature;
        circuit wires electrically connecting the RTD in a circuit via attachment to the leads, each circuit wire being formed of metal;
        dielectric insulation which seals around the circuit wires, the first lead, the second lead, the attachments between the first and second leads and the circuit wires and the RTD; and
    a woven metallic armour layer substantially exposed for fluid contact with the fluid being sensed, the woven metallic armour layer being flexible and extending longitudinally around the insulated sensing circuit, the woven metallic armour layer having a plurality of metallic strands extending longitudinally for heat conduction in the longitudinal direction toward or away from the RTD;
    wherein the sensing element of the RTD occupies a point relative to the length of the woven metallic armour layer, such that the heat conduction in the longitudinal direction toward or away from the RTD causes the point of the sensing element to sense a conduction-adjusted temperature relative to the length of the woven metallic armour layer.

2. The temperature sensor of claim 1, wherein the circuit wires extend out of a proximal end of the woven metallic armour layer, and wherein the woven metallic armour layer is joined to the circuit wires both proximal to the RTD and distal to the RTD.

3. The temperature sensor of claim 2, wherein the proximal end of the woven metallic armour layer is proximally joined by a tubular sealant to the dielectric insulation, with the tubular sealant placed around an external surface of the proximal end of the woven metallic armour layer.

4. The temperature sensor of claim 3, wherein the woven metallic armour layer extends from the proximal end to a distal end, and wherein the distal end of the woven metallic armour layer is distally joined by a tubular sealant to the dielectric insulation, with the tubular sealant placed around an external surface of the distal end of the woven metallic armour layer.

5. The temperature sensor of claim 1, wherein the woven metallic armour layer forms a circumferentially continuous lumen around the circuit wires.

6. The temperature sensor of claim 1, wherein the dielectric insulation comprises:
    dielectric sheathing around the circuit wires; and
    a singular tubular dielectric sealant around the RTD, the first lead, the second lead, the attachments between the first and second leads and the circuit wires, and a portion of the dielectric sheathing around the circuit wires.

7. The temperature sensor of claim 1, wherein the woven metallic armour layer comprises:
    at least four strands woven to form a lumen, with half of the strands extending helically clockwise around the circuit wires and the other half of the strands extending helically counter-clockwise-around the circuit wires.

8. The temperature sensor of claim 7, wherein the woven metallic armour layer comprises:
    twelve strands extending helically clockwise around the circuit wires and twelve strands extending helically counter-clockwise around the circuit wires.

9. The temperature sensor of claim 8, wherein each strand comprises a plurality of continuous metal filament members.

10. The temperature sensor of claim 9, wherein each strand comprises sixteen continuous metal filament members.

11. The temperature sensor of claim 1, wherein the woven metallic armour layer comprises at least sixty-four continuous metal filament members.

12. The temperature sensor of claim 1, wherein the woven metallic armour layer is formed of a plurality of continuous metal filament members, each filament member having a thickness which is less than 10% of a thickness of the temperature sensor.

13. The temperature sensor of claim 12, wherein each filament member has a thickness which is about 3% of the thickness of the temperature sensor.

14. The temperature sensor of claim 1, wherein the woven metallic armour layer is formed of strands of tin plated copper.

15. The temperature sensor of claim 1, comprising a plurality of longitudinally spaced RTDs arranged in a single square parallel/series array circuit.

16. A temperature sensor for approximating fluid temperature averaged across a location range in a duct, the sensor comprising:
    a plurality of temperature sensing elements spaced longitudinally between circuit wires in a single electrical circuit;
    dielectric insulation about the circuit wires and the sensing elements; and
    an armour layer having a plurality of metallic strands extending longitudinally for heat conduction in the longitudinal direction toward or away from each sensing element, the armour layer having openings therein which can permit fluid flow therethrough, the armour layer being flexible and extending longitudinally about the dielectric insulation, the circuit wires and the sensing elements;
    wherein each of the plurality of temperature sensing elements occupies a point relative to the length of the armour layer, such that the heat conduction in the longitudinal direction toward or away from each temperature sensing element causes the point of the temperature sensing element to sense a conduction-adjusted temperature relative to the length of the armour layer.

17. The temperature sensor of claim 16, wherein the plurality of longitudinally spaced sensing elements are resistance temperature detectors arranged in a single square parallel/series array circuit.

* * * * *